US008605955B2

United States Patent
Petrescu et al.

(10) Patent No.: US 8,605,955 B2
(45) Date of Patent: Dec. 10, 2013

(54) METHODS AND APPARATUSES FOR HALF-FACE DETECTION

(75) Inventors: Stefan Petrescu, Bucharest (RO); Mihnea Gangea, Bucharest (RO)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 551 days.

(21) Appl. No.: 12/825,280

(22) Filed: Jun. 28, 2010

(65) Prior Publication Data

US 2011/0158547 A1 Jun. 30, 2011

Related U.S. Application Data

(60) Provisional application No. 61/221,455, filed on Jun. 29, 2009.

(51) Int. Cl.
*G06K 9/62* (2006.01)
(52) U.S. Cl.
USPC .......................................... 382/118; 382/224
(58) Field of Classification Search
USPC ................................................ 382/118, 224
See application file for complete search history.

(56) References Cited

U.S. PATENT DOCUMENTS

| 4,448,510 | A | 5/1984 | Murakoshi et al. |
| 6,747,690 | B2 | 6/2004 | Molgaard |
| 7,099,510 | B2 * | 8/2006 | Jones et al. ................... 382/225 |
| 2002/0102024 | A1 | 8/2002 | Jones et al. |
| 2003/0184671 | A1 | 10/2003 | Robins et al. |
| 2006/0039690 | A1 | 2/2006 | Steinberg et al. |
| 2007/0036429 | A1 | 2/2007 | Terakawa |
| 2007/0172126 | A1 | 7/2007 | Kitamura |
| 2007/0189609 | A1 * | 8/2007 | Ito et al. ........................ 382/224 |
| 2007/0196019 | A1 * | 8/2007 | Yamaguchi ................... 382/224 |
| 2007/0263119 | A1 | 11/2007 | Shum et al. |
| 2010/0053368 | A1 | 3/2010 | Nanu et al. |

FOREIGN PATENT DOCUMENTS

| JP | 203111041 | 4/2003 |
| JP | 2004005694 | 1/2004 |
| JP | 2005/078158 A | 3/2005 |

(Continued)

OTHER PUBLICATIONS

Viola, Paul, et al., "Rapid Object Detection using a Boosted Cascade of Simple Features", IEEE, 2001, 8 pages.

(Continued)

*Primary Examiner* — Jon Chang
(74) *Attorney, Agent, or Firm* — Hickman Palermo Truong Becker Bingham Wong LLP

(57) ABSTRACT

Classifier chains are used to determine quickly and accurately if a window or sub-window of an image contains a right face, a left face, a full face, or does not contain a face. After acquiring a digital image, an integral image is calculated based on the acquired digital image. Left-face classifiers are applied to the integral image to determine the probability that the window contains a left face. Right-face classifiers are applied to the integral image to determine the probability that the window contains a right face. If the probability of the window containing a right face and a left face are both greater than threshold values, then it is determined that the window contains a full face. Alternatively, if only one of the probabilities exceeds a threshold value, then it may be determined that the window contains only a left face or a right face.

34 Claims, 9 Drawing Sheets

(56) References Cited

FOREIGN PATENT DOCUMENTS

| | | |
|---|---|---|
| JP | 2005/165984 A | 6/2005 |
| JP | 2005208760 | 8/2005 |
| JP | 2006-072770 A | 3/2006 |
| JP | 2006/072770 A | 3/2006 |
| JP | 2007/047965 A | 2/2007 |
| JP | 2007/241424 A | 9/2007 |
| JP | 2008/005081 A | 1/2008 |
| WO | WO2006/095860 A | 9/2006 |
| WO | WO2008/107112 A2 | 9/2008 |
| WO | WO2008/107112 A3 | 9/2008 |
| WO | 2011/000841 A1 | 1/2011 |

OTHER PUBLICATIONS

Viola, Paul, et al., "Robust Real-Time Face Detection", International Journal of Computer Vision, 18 pages; vol. 57: Issue 2, May 2004.

PCT Invitation to Pay Additional Fees and, Where Applicable, Protest Fee, for PCT Application No. PCT/EP2010/059228, dated Aug. 12, 2010, 6 pages.

PCT Notification of Transmittal of the International Search Report and the Written Opinion of the International Searching Authority, or the Declaration, for PCT Application No. PCT/EP2010/059228, dated Nov. 19, 2010, 19 pages.

Josh Harguess, J. K. Aggarwal, A Case for the Average-Half-Face in 2D and 3D for Face Recognition, Computer Vision and Pattern Recognition Workshops, 2009, CVPR Workshops 2009, IEEE Computer Society Conference on, IEEE, Piscataway, NJ, USA, Jun. 20, 2009, pp. 7-12, XP031512342 ISBN: 978-1-4244-3994-2.

Patent Abstracts of Japan, for publication No. JP 2006-072770, published Mar. 16, 2006, Face Detection Device and Face Direction Estimation Device, 1 page.

Japanese Office Action received in International Application No. 512405/2012 dated Jun. 25, 2013 (7 pages).

Japanese Current Claims of 512405/2012 dated Jun. 2013 (9 pages).

Japanese Office Action received in International Application No. 2012-516781 dated Jun. 18, 2013 (4 pages).

Japanese Current Claims of 2012-516781 dated Jun. 2013 (4 pages).

Sun, J. et al., "Flash Matting" *2006 ACM* (pp. 772-778).

U.S. Appl. No. 12/843,805, filed Jul. 26, 2010, Corrected Notice of Allowance, Dec. 18, 2013.

Tang et al., "Representing Images Using Nonorhogonal Haar-Like Bases", IEEE, vol. 29, No. 12, dated Dec. 2007, 15 pages.

Wikipedia, "Haar-like features", http://en.wikipedia.org/wiki/Haar-like_features, last accessed on Aug. 11, 2013, 1 page.

Whitehill et al., "Haar Features for FACS AU Recognition" IEEE, dated 2006, 5 pages.

\* cited by examiner

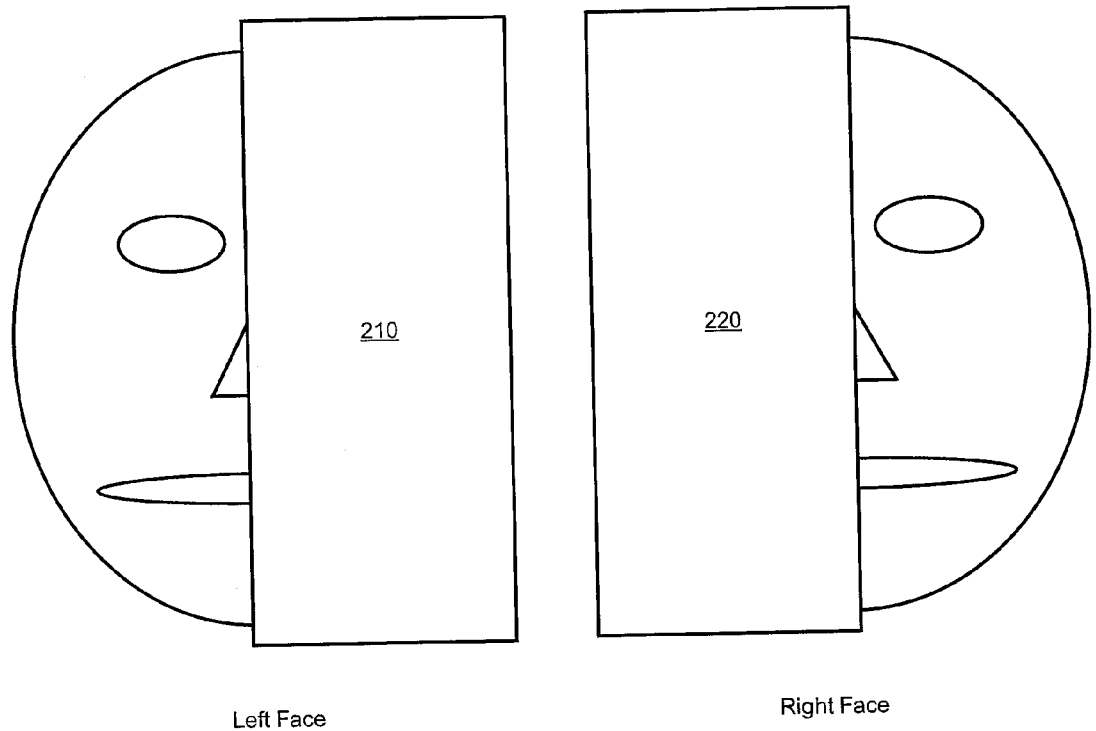
Left Face
Right Face
Fig. 2b
Fig. 2c
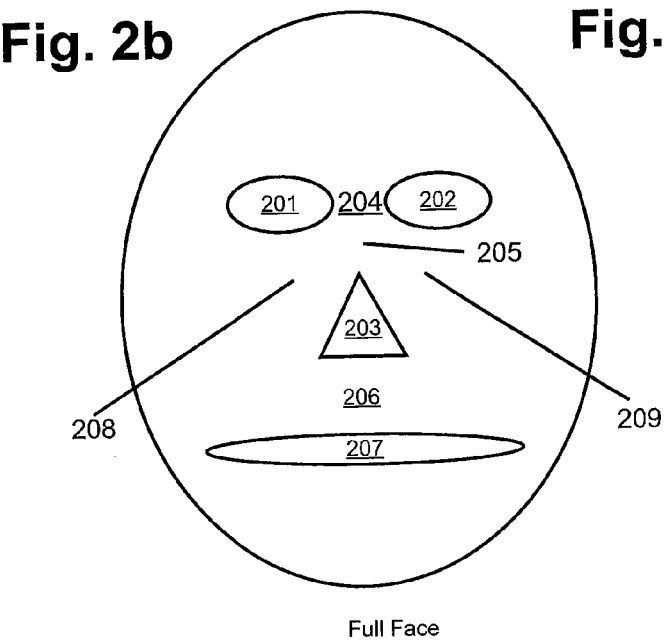
Full Face
Fig. 2a

Fig. 5a  Fig. 5c

METHODS AND APPARATUSES FOR HALF-FACE DETECTION

CLAIM OF PRIORITY

The present application claims domestic priority under 35 U.S.C. §119(e) to U.S. Provisional Patent Application Ser. No. 61/221,455, which is titled "Methods And Apparatuses For Half-Face Detection," which was filed on Jun. 29, 2009, and whose contents are incorporated by reference herein.

FIELD OF THE INVENTION

The present invention relates generally to digital image processing and more particularly to techniques for face detection and recognition, including techniques for detecting full faces and half faces.

BACKGROUND OF THE INVENTION

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Many existing digital image processing algorithms utilize facial recognition and detection techniques in order to identify human faces in a digital image. Identifying human faces is often a necessary or desired step in various image enhancement and image alteration applications. For example, identifying human faces can be used as a step in algorithms that enhance the separation of a subject in the foreground from the background in order to enhance depth of field or to separate the face or a body from the background altogether. Identifying human faces can also be used as a step in image correction algorithms that are used to identify and correct defects in a digital image. For example, by knowing if an object is a face or not a face, a location of eyes can be estimated and used to increase the number of true positives identified by a redeye removal algorithm and reduce the number of false positives identified by the redeye removal algorithm.

A well-known fast-face detection algorithm is disclosed in US Patent Publication No. 2002/0102024, hereinafter Viola-Jones, which is hereby incorporated by reference in its entirety for all purposes. Viola-Jones proposes a classifier chain consisting of a series of sequential feature detectors. The classifier chain rejects image patterns that do not represent faces and accepts image patterns that do represent faces.

Although the original Viola-Jones algorithm is significantly faster than previous face detectors, it still involves significant computation that is difficult to perform in real-time, especially in a resource-restricted embedded system, such as a hand held image acquisition device like a digital camera, hand-held computer, or cellular phone equipped with a camera. Additionally, current implementations of Viola-Jones require separate classifier chains for detecting full faces, left faces, and right faces, thus significantly increasing computation time if detection of half faces is desired in addition to detection of full faces.

BRIEF DESCRIPTION OF THE DRAWINGS

FIGS. 2a-c show illustrations of a full human face, a face with the right side obstructed, and a face with the left side obstructed.

FIGS. 5a-c show a graphical representation of a left-face classifier applied to a left face, a full face, and a right face.

DETAILED DESCRIPTION OF EMBODIMENTS OF THE INVENTION

Figure 1:
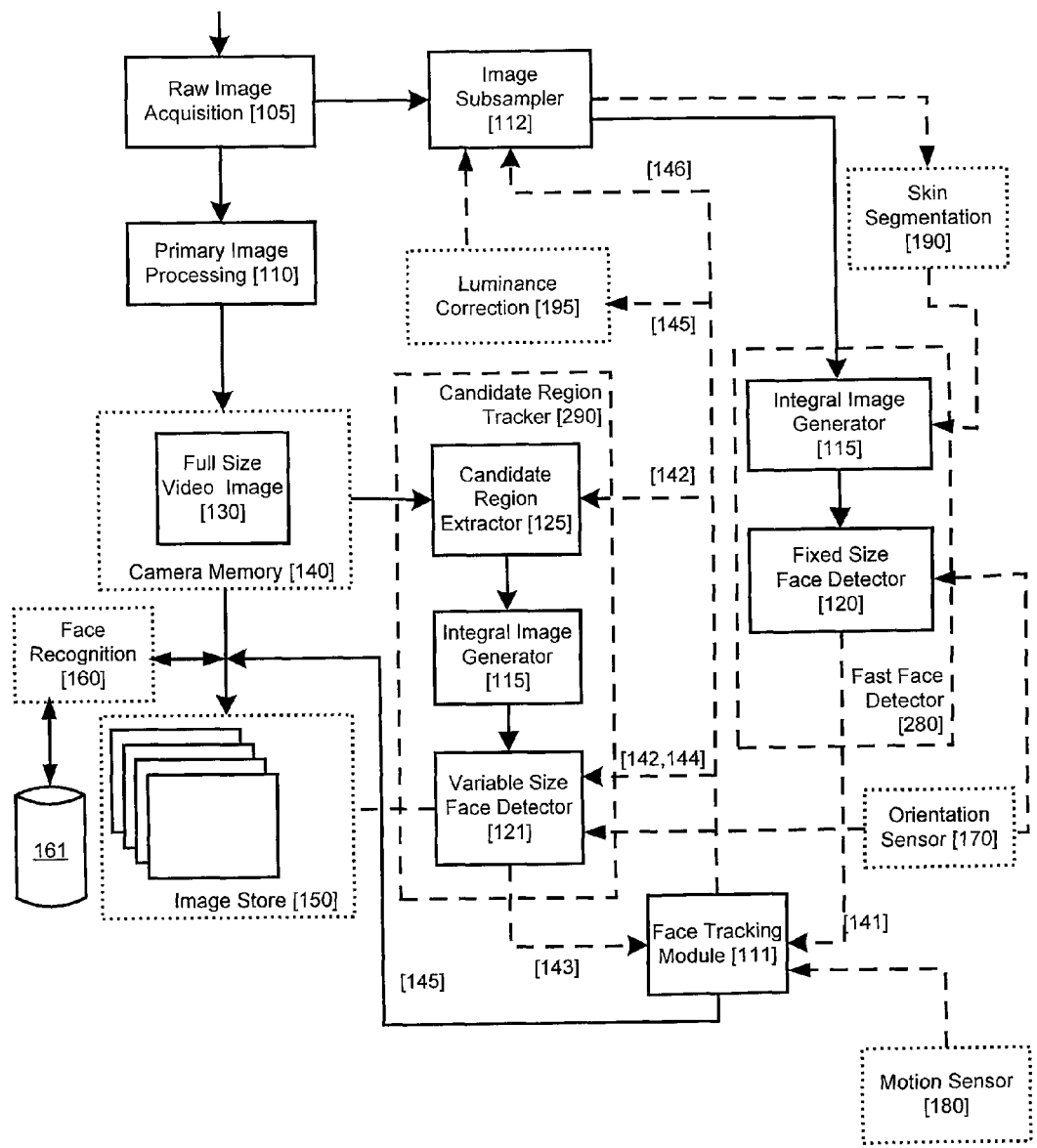
FIG. 1 shows the primary subsystems of a face tracking system in accordance with certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Embodiments of the present invention include a method of using classifier chains to determine quickly and accurately if a window or sub-window of an image contains a right face, a left face, a full face, or does not contain a face. After acquiring a digital image, an integral image can be calculated based on the acquired digital image. One or more left-face (LF) classifiers can be applied to the integral image to determine the probability that the window contains a left face. One or more right-face (RF) classifiers can be applied to the integral image to determine the probability that the window contains a right face. If the probability of the window containing a right face and a left face are both greater than threshold values, then it can be determined that the window contains both a right face and a left face, i.e. a full face. If the probability of the window containing a right face is above a threshold value and the probability of the window containing a left face is below a threshold value, then it can be determined that the window contains a right face but no left face. If the probability of the window containing a right face is below a threshold value and the probability of the window containing a left face is above a threshold value, then it can be determined that the window contains a left face but no right face. If the probability of the window containing a right face and a left face are both below a threshold value, then it can be determined that the window does not contain a face.

Further embodiments of the present invention include applying a full-face classifier to a window of the integral image to verify the determination made based on the left-face classifiers and the right-face classifiers. For example, if the probability of the window containing a right face and a left face are both greater than threshold values, then applying a full-face classifier should show that it is highly probable that the window contains a full face because a full face includes a right face and a left face. If either the probability of the window containing a left face or a right face are below a threshold value, then a full-face classifier applied to the integral image should confirm that the window does not contain a full face. If the determination made when applying the right-face or left-face classifiers to the integral image contradicts the determination made when applying the full-face classifiers, then further, more computationally expensive analysis, can be performed to determine if the window contains a right face, left face, or full face.

Further embodiments of the present invention include using a right-face classifier to calculate a left-face classifier that is a minor image of the right-face classifier, or using a left-face classifier to calculate a mirror right-face classifier.

Embodiments of the present invention also include a digital image acquisition system, having no photographic film, comprising means for carrying out one or more steps of the methods described in this application. Alternate embodiments of the present invention include one or more machine-readable storage media storing instructions which when executed by one or more computing devices cause the performance of one or more steps of the methods described in this application.

Digital Image Acquisition System

FIG. 1 shows the primary subsystems of a face tracking system in accordance with certain embodiments. The solid lines indicate the flow of image data; the dashed lines indicate control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera, or a combination thereof.

A digital image, i(x, y), is acquired in raw format from an image sensor 105 such as a charged coupled device (CCD) sensor or complimentary metal oxide semiconductor (CMOS) sensor. An image subsampler 112 generates a smaller copy of the main image. Most digital cameras already contain dedicated hardware subsystems to perform image subsampling, for example to provide preview images to a camera display. Typically, the subsampled image is provided in bitmap format (RGB or YCC). In the meantime, the normal image acquisition chain performs post-processing on the raw image 110 which typically includes some luminance and color balancing. In certain digital imaging systems, the subsampling may occur after such post-processing, or after certain post-processing filters are applied, but before the entire post-processing filter chain is completed.

The subsampled image is next passed to an integral image generator 115 which creates an integral image from the subsampled image. The integral image, ii(x,y), at location (x, y) contains the sum of the pixel values above and to the left of point (x, y) from image i(x,y).

This integral image is next passed to a fixed size face detector 120. The face detector is applied to the full integral image, but as this is an integral image of a subsampled copy of the main image, the processing involved in the face detection is proportionately reduced. If the subsampled image is ¼ of the main image, e.g., has ¼ the number of pixels and/or ¼ the size, then the processing time involved is only about 25% of that for the full image.

This approach is particularly amenable to hardware embodiments where the subsampled image memory space can be scanned by a fixed size DMA window and digital logic to implement a Haar-feature classifier chain can be applied to this DMA window. Several sizes of classifiers may alternatively be used (in a software embodiment), or multiple fixed-size classifiers may be used (in a hardware embodiment). An advantage is that a smaller integral image is calculated.

After application of the fast face detector 280, any newly detected candidate face regions 141 are passed onto a face tracking module 111, where any face regions confirmed from previous analysis 145 may be merged with new candidate face regions prior to being provided 142 to a face tracker 290.

The face tracker 290 provides a set of confirmed candidate regions 143 back to the tracking module 111. Additional image processing filters are preferably applied by the tracking module 111 to confirm either that these confirmed regions 143 are face regions or to maintain regions as candidates if they have not been confirmed as such by the face tracker 290. A final set of face regions 145 can be output by the module 111 for use elsewhere in the camera or to be stored within or in association with an acquired image for later processing either within the camera or offline. Set 145 can also be used in a next iteration of face tracking.

After the main image acquisition chain is completed, a full-size copy of the main image 130 will normally reside in the system memory 140 of the image acquisition system. This may be accessed by a candidate region extractor 125 component of the face tracker 290, which selects image patches based on candidate face region data 142 obtained from the face tracking module 111. These image patches for each candidate region are passed to an integral image generator 115, which passes the resulting integral images to a variable sized detector 121, as one possible example a Viola-Jones detector, which then applies a classifier chain, preferably at least a 32 classifier chain, to the integral image for each candidate region across a range of different scales.

The range of scales 144 employed by the face detector 121 is determined and supplied by the face tracking module 111 and is based partly on statistical information relating to the history of the current candidate face regions 142 and partly on external metadata determined from other subsystems within the image acquisition system.

As an example of the former, if a candidate face region has remained consistently at a particular size for a certain number of acquired image frames, then the face detector 121 is applied at this particular scale and/or perhaps at one scale higher (i.e. 1.25 times larger) and one scale lower (i.e. 1.25 times lower).

As an example of the latter, if the focus of the image acquisition system has moved to approximately infinity, then the smallest scalings will be applied in the face detector 121. Normally these scalings would not be employed, as they would be applied a greater number of times to the candidate face region in order to cover it completely. It is worthwhile noting that the candidate face region will have a minimum size beyond which it should not decrease—this is in order to allow for localized movement of the camera by a user between frames. In some image acquisition systems which contain motion sensors, such localized movements may be tracked. This information may be employed to further improve the selection of scales and the size of candidate regions.

The candidate region tracker 290 provides a set of confirmed face regions 143 based on full variable size face detection of the image patches to the face tracking module 111. Clearly, some candidate regions will have been confirmed while others will have been rejected, and these can be explicitly returned by the tracker 290 or can be calculated by the tracking module 111 by analyzing the difference between the confirmed regions 143 and the candidate regions 142. In either case, the face tracking module 111 can then apply alternative tests to candidate regions rejected by the tracker 290 to determine whether these should be maintained as candidate regions 142 for the next cycle of tracking or whether these should indeed be removed from tracking.

Once the set of confirmed candidate regions 145 has been determined by the face tracking module 111, the module 111 communicates with the sub-sampler 112 to determine when the next acquired image is to be sub-sampled, and so provided to the detector 280, and also to provide the resolution 146 at which the next acquired image is to be sub-sampled.

Where the detector 280 does not run when the next image is acquired, the candidate regions 142 provided to the extractor 125 for the next acquired image will be the regions 145 confirmed by the tracking module 111 from the last acquired image. On the other hand, when the face detector 280 provides a new set of candidate regions 141 to the face tracking module 111, these candidate regions are preferably merged with the previous set of confirmed regions 145 to provide the set of candidate regions 142 to the extractor 125 for the next acquired image.

Zoom information may be obtained from camera firmware. Using software techniques which analyze images in camera memory 140 or image store 150, the degree of pan or tilt of the camera may be determined from one image to another.

In one embodiment, the acquisition device is provided with a motion sensor 180, as illustrated at FIG. 1, to determine the degree and direction of pan from one image to another, and avoiding the processing involved in determining camera movement in software.

Such motion sensor for a digital camera may be based on an accelerometer, and may be optionally based on gyroscopic principals within the camera, primarily for the purposes of warning or compensating for hand shake during main image capture. U.S. Pat. No. 4,448,510, to Murakoshi, which is hereby incorporated by reference, discloses such a system for a conventional camera, and U.S. Pat. No. 6,747,690, to Molgaard, which is also incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometer may allow software control of the amplifier stage which allows the sensitivity to be adjusted.

The motion sensor 180 could equally be implemented with MEMS sensors of the sort which will be incorporated in next generation consumer cameras and camera-phones.

In any case, when the camera is operable in face tracking mode, i.e., constant video acquisition as distinct from acquiring a main image, shake compensation would typically not be used because image quality is lower. This provides the opportunity to configure the motion sensor 180 to sense large movements by setting the motion sensor amplifier module to low gain. The size and direction of movement detected by the sensor 180 is preferably provided to the face tracker 111. The approximate size of faces being tracked is already known, and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the locations of candidate regions as a function of the direction and size of the movement. Alternatively, the size of the region over which the tracking algorithms are applied may also be enlarged (and the sophistication on the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105,110 for full-sized images to employ normal shake compensation algorithms based on information from the motion sensor 180.

An alternative way of limiting the areas of an image to which the face detector 120 is to be applied involves identifying areas of the image which include skin tones. U.S. Pat. No. 6,661,907, which is hereby incorporated by reference, discloses one such technique for detecting skin tones and subsequently only applying face detection in regions having a predominant skin color.

In one embodiment, skin segmentation 190 is preferably applied to a sub-sampled version of the acquired image. If the resolution of the sub-sampled version is not sufficient, then a previous image stored in image store 150 or a next sub-sampled image can be used as long as the two images are not too different in content from the current acquired image. Alternatively, skin segmentation 190 can be applied to the full size video image 130.

In any case, regions containing skin tones are identified by bounding rectangles. The bounding rectangles are provided to the integral image generator 115, which produces integral image patches corresponding to the rectangles in a manner similar to that used by the tracker integral image generator 115.

Not only does this approach reduce the processing overhead associated with producing the integral image and running face detection, but in the present embodiment, it also allows the face detector 120 to apply more relaxed face detection to the bounding rectangles, as there is a higher chance that these skin-tone regions do in fact contain a face. So for a Viola-Jones detector 120, a shorter classifier chain can be employed to more effectively provide similar quality results to running face detection over the whole image with longer VJ classifiers required to positively detect a face.

Further improvements to face detection are also contemplated in other embodiments. For example, based on the fact that face detection can be very dependent on illumination conditions, such that small variations in illumination can cause face detection to fail and cause somewhat unstable detection behavior, in another embodiment, confirmed face regions 145 are used to identify regions of a subsequently acquired sub-sampled image on which luminance correction may be performed to bring regions of interest of the image to be analyzed to the desired parameters. One example of such correction is to improve the luminance contrast within the regions of the sub-sampled image defined by confirmed face regions 145.

Contrast enhancement may be used to increase local contrast of an image, especially when the usable data of the image is represented by close contrast values. Through this adjustment, intensities of pixels of a region when represented on a histogram, which would otherwise be closely distributed, can be better distributed. This allows for areas of lower local contrast to gain a higher contrast without affecting global contrast. Histogram equalization accomplishes this by effectively spreading out the most frequent intensity values.

The method is useful in images with backgrounds and foregrounds that are both bright or both dark. In particular, the method can lead to better detail in photographs that are over-exposed or under-exposed.

Alternatively, this luminance correction can be included in the computation of an "adjusted" integral image in the generators 115.

In another improvement, when face detection is being used, the camera application is set to dynamically modify the exposure from the computed default to a higher values (from frame to frame, slightly overexposing the scene) until the face detection provides a lock onto a face.

Further embodiments providing improved efficiency for the system described above are also contemplated. For example, face detection algorithms typically employ methods or use classifiers to detect faces in a picture at different orientations: 0, 90, 180 and 270 degrees. The camera may be equipped with an orientation sensor 170, as illustrated at FIG. 1. This can include a hardware sensor for determining whether the camera is being held upright, inverted or tilted clockwise or counter-clockwise. Alternatively, the orientation sensor can comprise an image analysis module connected either to the image acquisition hardware 105, 110 or camera memory 140 or image store 150 for quickly determining whether images are being acquired in portrait or landscape mode and whether the camera is tilted clockwise or counter-clockwise.

Once this determination is made, the camera orientation can be fed to one or both of the face detectors 120, 121. The detectors may apply face detection according to the likely orientation of faces in an image acquired with the determined camera orientation. This feature can either significantly reduce the face detection processing overhead, for example, by avoiding the employment of classifiers which are unlikely to detect faces, or increase its accuracy by running classifiers more likely to detects faces in a given orientation more often.

Classifier Chains

FIGS. 2*a-c* show illustrations of a full human face, a face with the right side obstructed, and a face with the left side obstructed. FIG. 2*a* represents a full face 200 with a left eye 201, a right eye 202, a front of the nose 203, a space between the eyes 204, a bridge of the nose 205, lips 207, a space between the nose and the lips 206, and a left cheek 208, and a right cheek 209.

FIG. 2*b* represents a face similar to the face of FIG. 2*a* but with an obstruction 210 blocking the right side of the face. In the context of a digital image acquired by a system such as that described in FIG. 1, the obstruction 210 might be a person's hair, another face, or any other object obstructing the face. Throughout this disclosure, a face with an obstruction 210 blocking a right portion of the face, as in FIG. 2*b*, will be referred to as a left face or a left-sided face. FIG. 2*c* represents a face similar to the face of FIG. 2*a* but with an obstruction 220 blocking the left side of the face. Throughout this disclosure a face with an obstruction 220 blocking a left portion of the face, as in FIG. 2*c*, will be referred to as a right face or a right-sided face.

FIGS. 3*a-f* show graphical representations of a chain of full-face classifiers, and graphical representations of those full-face classifiers applied to illustrations of full faces. Techniques of the present invention include applying a first classifier of a chain of classifiers to a window of an image to determine if the window contains a first feature indicative of a full face. The determination may be binary and only produce a "pass" or "fail." Alternatively, the determination may produce a probability of the window containing a face, in which case "pass" or "fail" can be determined by whether the probability is above or below a threshold value. "Pass" or "fail" may also be determined by summing the results of multiple classifiers as opposed to being based on a single classifier in a chain.

If the window "passes" the classifier, then the feature of the classifier is detected in the window, and if the window "fails" the classifier, then the feature is not detected in the window. If the window does not contain the first feature, then the window can be identified as not containing a face, and no additional classifiers need to be applied to the window. If the window does contain the feature of the first classifier, then a second classifier can be applied to the window to determine if the window contains a second feature indicative of a face. If the window does not contain the second feature, then the image can be identified as not containing a face, and no additional classifiers need to be applied to the window. If the window does contain the second feature, then a third classifier can be applied to the window. This process can repeat itself until the window passes enough classifiers to indicate a high probability of the window containing a face, or until the window fails a classifier, indicating that the window does not contain a face. Typically, each subsequent classifier in a classifier chain detects different features, more features, or more accurate instances of features than did previously applied classifiers. By applying the simplest classifiers that require the least accuracy early in the chain, those windows that do not contain faces can be quickly identified and eliminated without requiring the computer processing needed to apply the more sophisticated and more accurate classifiers. The number and type of classifiers used can be determined by machine-training techniques known in the art.

Figure 3A:
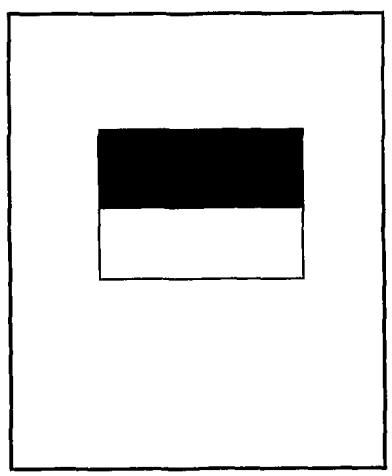
FIGS. 3a-g show graphical representations of full-face classifiers, and graphical representations of those full-face classifiers applied to illustrations of a full human face.
Figure 3B:
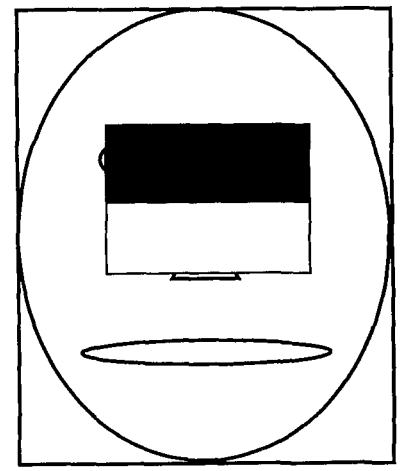

An example of a feature indicative of a face in a window is the area in a window corresponding to the eyes being darker than the area below the eyes. FIG. 3*a* is a graphical representation of a possible first classifier for detecting such a feature, and FIG. 3*b* shows a graphical representation of that first classifier applied to a window with a full face.

Figure 3C:
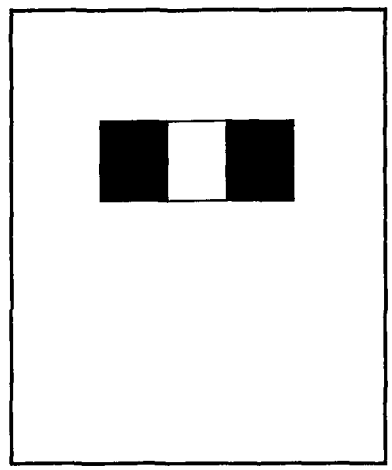
Figure 3D:
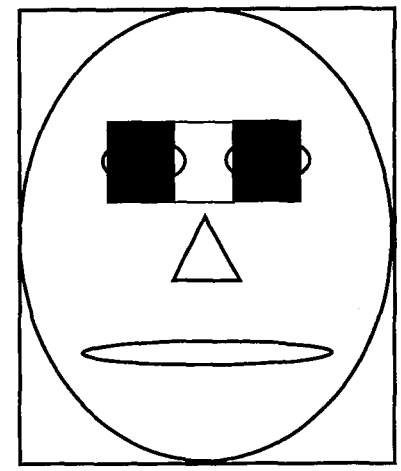
Figure 3E:
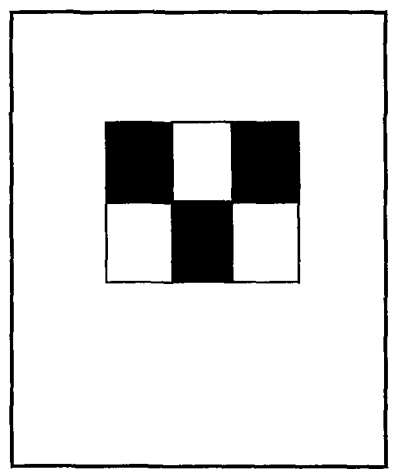
Figure 3F:
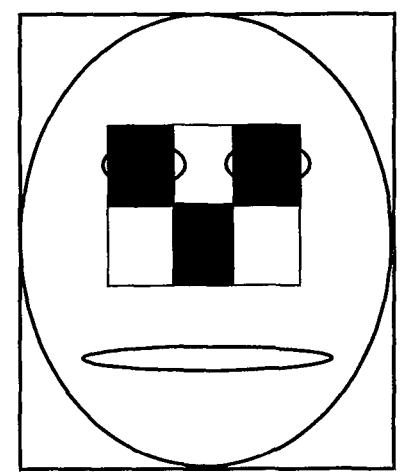

FIG. 3*c* is a graphical representation of a possible second classifier that might be applied to a window of an image if the window passes the first classifier shown in FIG. 3*a*. The classifier in FIG. 3*c* determines if the region corresponding to the eyes is darker than the region between the eyes, which is a second feature indicative of a face. FIG. 3*d* shows a graphical representation of the classifier in FIG. 3*c* applied to a window with a full face. FIG. 3*e* shows a graphical representation of a more complicated, more accurate classifier that can be applied to the window if the window passes the classifiers of FIGS. 3*a* and 3*c*. FIG. 3*f* shows the classifier of FIG. 3*e* applied to a window with a full face.

Figure 3G:
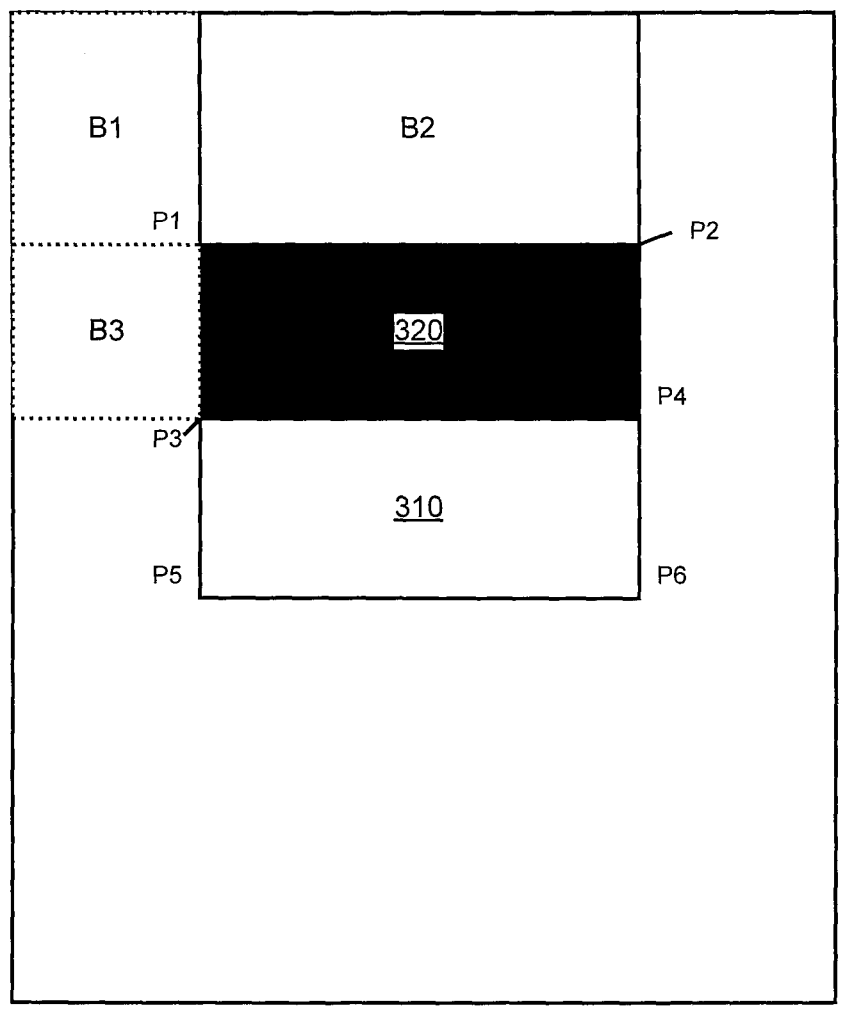

From the integral image, the sum of pixel values within a rectangular region of the image can be computed with four array references. For example, FIG. 3*g* is an enlarged graphical representation of the same classifier shown in FIG. 3*a*. The value of P1 represents the sum of pixel values above and to the left of point P1 (i.e. box B1). The value of P2 represents the sum of pixel values above and to the left of point P2 (i.e. boxes B1 and B2). The value of P3 represents the sum of pixels above and to the left of point P3 (i.e. boxes B1 and B3). The value of P4 represents the sum of pixels above and to the left of point P4 (i.e. boxes B1, B2, B3 and region 320). Accordingly, the sum of pixel values within region 320 can be calculated from the four reference points P1, P2, P3, and P4 by the equation: sum region 320=P4+P1−(P2+P3). A sum of pixel values can similarly be calculated for region 310 from reference points P3, P4, P5, and P6.

Using a look-up table, a probability that the window contains a face can be determined based on the difference in luminance between region 320 and region 310. The determined probability can be used to determine whether the window passes or fails the classifier or chain of classifiers.

Figure 4A:
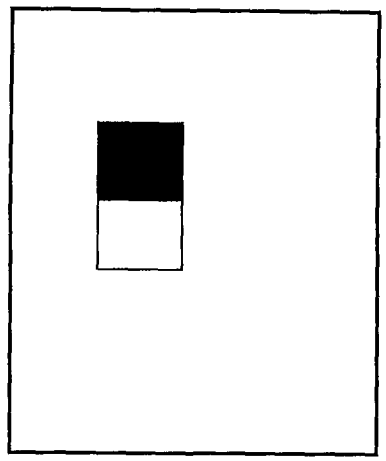
FIGS. 4a-f show graphical representations of left face classifiers, and graphical representations of those left-face classifiers applied to illustrations of a full human face.
Figure 4B:
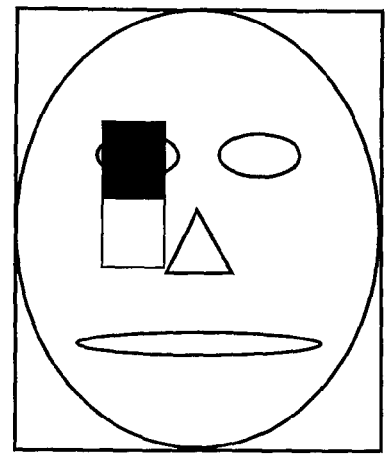
Figure 4C:
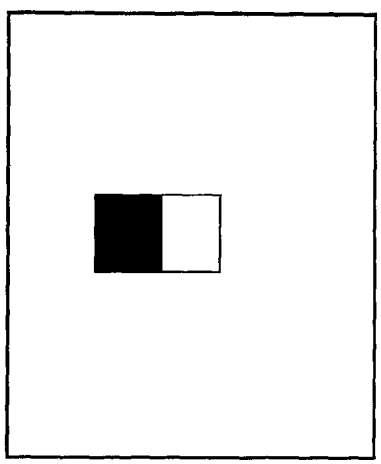
Figure 4D:
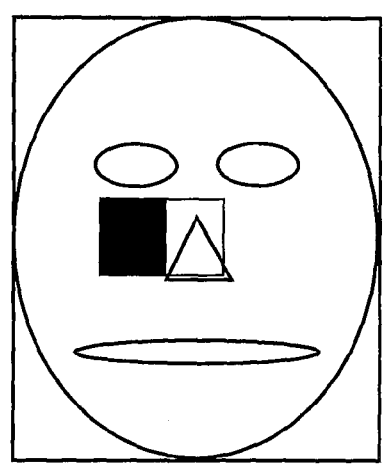
Figure 4E:
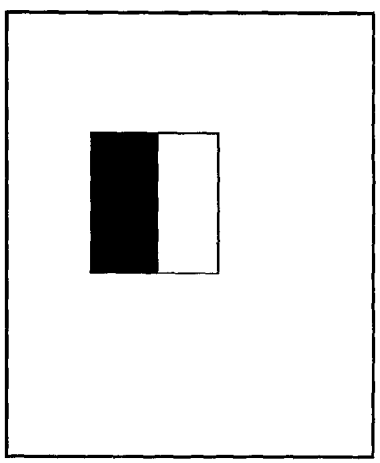
Figure 4F:
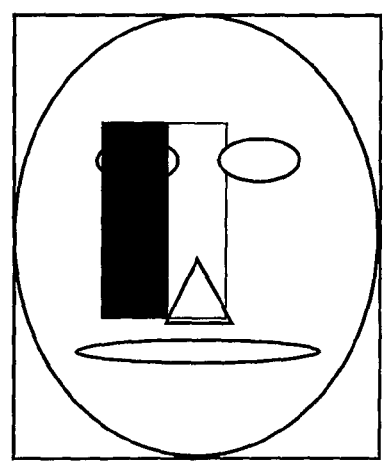

FIGS. 4a-f show graphical representations of a chain of left-face classifiers, and graphical representations of those left-face classifiers applied to illustrations of a full face. The left-face classifiers can be applied to a window in the same manner described relative to the classifiers of FIGS. 3a-f, but instead of detecting features indicative of a full face, the classifiers are detecting features indicative of a left face. For example, in an image containing a left face, the area of an image corresponding to a portion of an eye will be darker than the area of the image corresponding to below the eye. FIG. 4a shows a graphical representation of a classifier for detecting such a feature, and FIG. 4b shows a graphical representation of the classifier of FIG. 4a applied to a full face. FIGS. 4c and 4e show examples of classifiers for detecting the presence of additional features, and FIGS. 4d and 4f shows graphical representations of those classifiers applied to full faces.

Figure 5B:
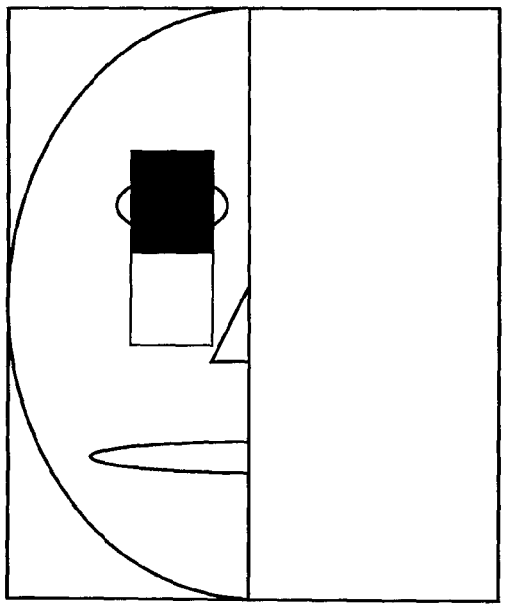

FIGS. 5a-c show a graphical representation of left-face classifiers applied to a window with a left face, a window with a full face, and a window with a right face. The left-face classifier detects in a window the presence of a darker region corresponding to an eye above a lighter region corresponding to a cheek. In FIG. 5a, the left-face classifier is applied to a window with a left face, in which case the window would pass the classifier indicating that the feature is present in the window. If the classifier is applied to a full face, as in FIG. 5b, the window will also pass because the feature is also present in the full face. If, however, the left-face classifier is applied to a right face, the window will fail because the feature is not present in the window. Thus, if a window passes a chain of left-face classifiers, it can be determined that the window contains either a left face or a full face. If the window fails a chain of left-face classifiers, then it can be determined that the window either contains a right face or contains no face.

Figure 5B:
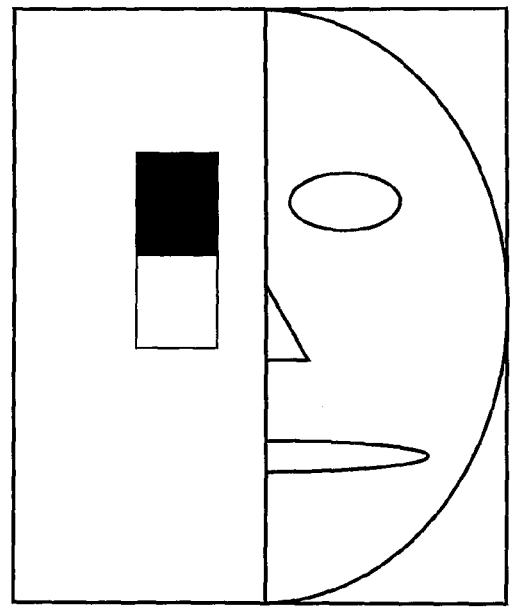
Figure 5B:
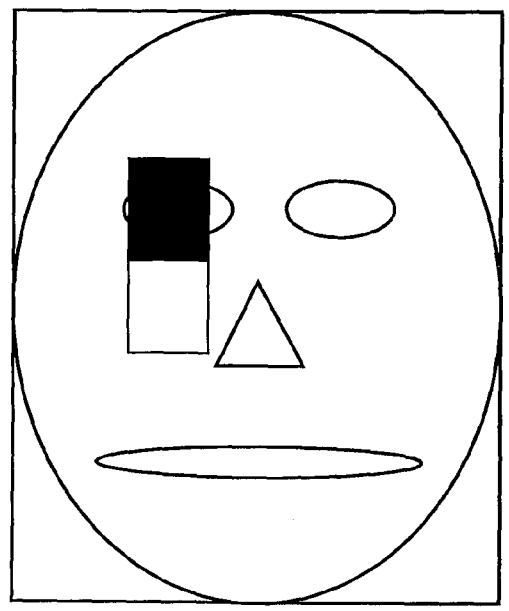

The principles described in relation to FIGS. 4 and 5 can also be applied to a chain of right-face classifiers. If a window passes a chain of right-face classifiers, then the window contains either a right face or a full face. If the window fails a chain of right-face classifiers, then the window contains either a left face or contains no face.

Figure 6A:
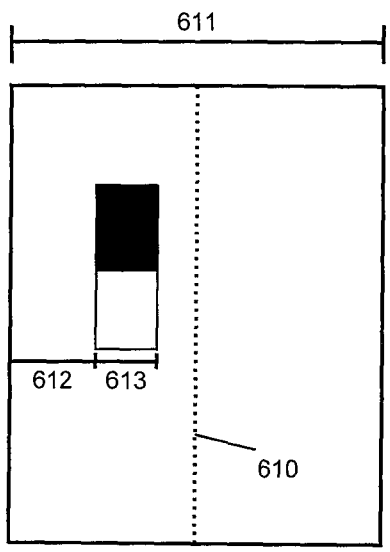
FIGS. 6a-d show graphical representations of left-face classifiers and corresponding right-face mirror classifiers.
Figure 6B:
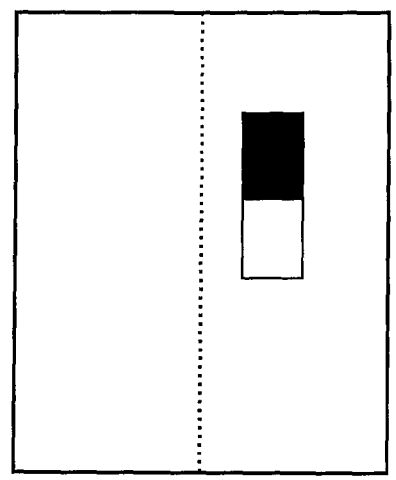
Figure 6C:
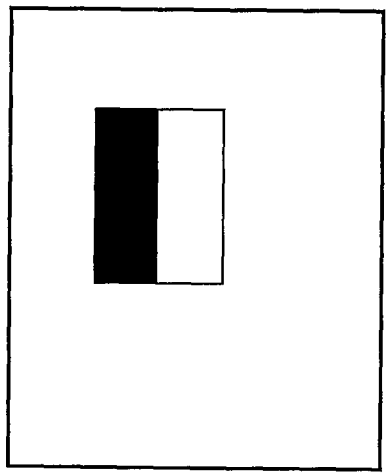
Figure 6D:
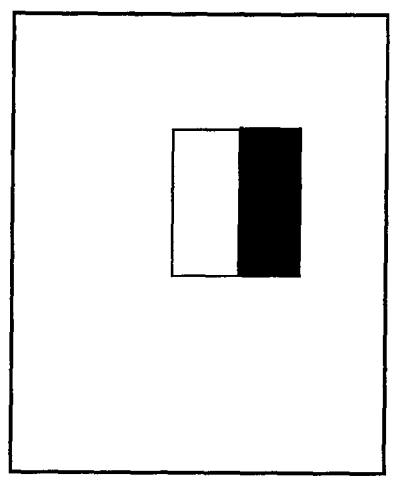

FIGS. 6a-d show graphical representations of left-face classifiers and right-face classifiers that are minor classifiers of one another. A right-face mirror classifier detects the same feature as a left-face classifier, but detects that feature on the opposite side of a window which would correspond to the opposite side of the face. For example, the left-face classifier of FIG. 6a might detect a darker region on the left side of a window above a lighter region on the left side of a window, which would be indicative of a left eye and left cheek and thus indicative of a left face. The classifier of FIG. 6b is a mirror of the classifier of FIG. 6a. The classifier of FIG. 6b detects the presence of a darker region on the right side of a window above a lighter region on the right side of the window which would indicate a right eye above a right cheek and thus a right face. FIG. 6c shows another left-face classifier that is a mirror classifier of the right-face classifier illustrated by FIG. 6d. The classifiers in FIGS. 6b and 6d can be viewed as the classifiers of FIGS. 6a and 6c having been flipped across a vertical axis of symmetry 610.

Data Structure of a Classifier

Below are example data structures for Haar and Census classifiers:

```
typedef struct CensusFeature
{
    INT32 threshold;
    UINT8 type;
    UINT8 x, y;
    const INT16* lut;
    BOOL bSymetric;
} CensusFeature;
typedef struct HaarFeature
{
    INT32 threshold;
    UINT8 type;
    UINT8 x, y, dx, dy, shift;
    const INT16* lut;
    BOOL bSymetric;
} HaarFeature;
```

In the structures, "threshold" represents the threshold level used to determine if a region passes or fails a classifier or chain of classifiers.

In the structures, "type" represents the type of feature being detected. For example, the feature shown in FIG. 3a might be referred to as Haar2 vertical, and the feature shown in FIG. 3c might be referred to as Haar3 horizontal. The type of feature being detected determines how the classifier is applied to a window. For example, a horizontal-type classifier indicates that a difference in luminance is being detected between a left region and a right region as in FIG. 3c, while a vertical-type classifier indicates a difference in lumninance is being detected between a top region and a bottom region as in FIG. 3a.

In the structures, "x" and "y" represent the top, left coordinates of the feature in the base face size. For example, with reference to FIG. 3g, coordinates (x, y) would be the coordinates of point P1.

In the structures, "dx" and "dy" represent the dimension of the feature in the base face size. For example, with reference to FIG. 3g, dx would be the difference between the x-coordinate of point P2 and the x-coordinate of point P1, and dy would be the difference between the y-coordinate of point P5 and the y-coordinate of point P1.

In the structures, "lut" identifies the look up table containing the probabilities of a detected difference in luminance being indicative of a face.

In the structures, "bSymetric" represents a boolean value (true/false) used to specify whether the classifier has a mirror classifier.

If the value of bSymetric indicates that a mirror classifier exists, then the mirror classifier can be applied by determining a new value for the x-coordinate of the mirror classifier. The values of y, dx, dy, threshold, lut, and type will be the same for a classifier and that classifier's mirror classifier. The new value of x (referred to hereinafter as "x'") can be determined using known variables. For example, as shown in FIG. 6b, using the base face size 611, the x-coordinate 612, and dx 613 from the features shown in FIG. 6a, x' can be calculated as x'=base face size−x−dx. The calculations used to determine other mirror classifiers may differ from the calculation shown for FIG. 6b, but the calculations will typically only involve addition and subtraction, which can be performed rapidly.

An aspect of an embodiment of the present invention includes storing in memory, such as on a portable digital image acquisition device like the one shown in FIG. 1, a plurality of classifiers and using the techniques of an embodiment of the present invention to determine minor classifiers for the plurality of classifiers as opposed to storing both the classifiers and the minor classifiers. The techniques of certain embodiments of the present invention save on-board memory space and can be performed rapidly because the needed functions primarily comprise basic arithmetic.

Example Method

Techniques of certain embodiments of the present invention include a method for identifying a face in a window of an image, the method comprising: acquiring a digital image; computing an integral image based on the digital image; applying a first chain of one or more classifiers to the integral image to determine if the window contains a first portion of a face; applying a second chain of one or more classifiers to the integral image to determine if the window contains a second portion of a face; and determining, based at least in part on the presence or absence of the first portion of a face and the presence or absence of the second portion of a face, whether the window contains no face, a partial face, or a full face. In some embodiments of the present invention, one or more classifiers of the second chain are mirror classifiers of one or more classifiers of the first chain. In some embodiments of the present invention, the first chain of classifiers is to determine if a window contains a left face and the second chain of classifiers is to determine if the window contains a right face. In some embodiments of the present invention, the method further comprises: applying a third chain of classifiers to verify the determining based at least in part on the presence or absence of the first portion of a face and the presence or absence of the second portion of a face. In some embodiments of the present invention the third set of classifiers is to determine if the window contains a full face.

Figure 7:
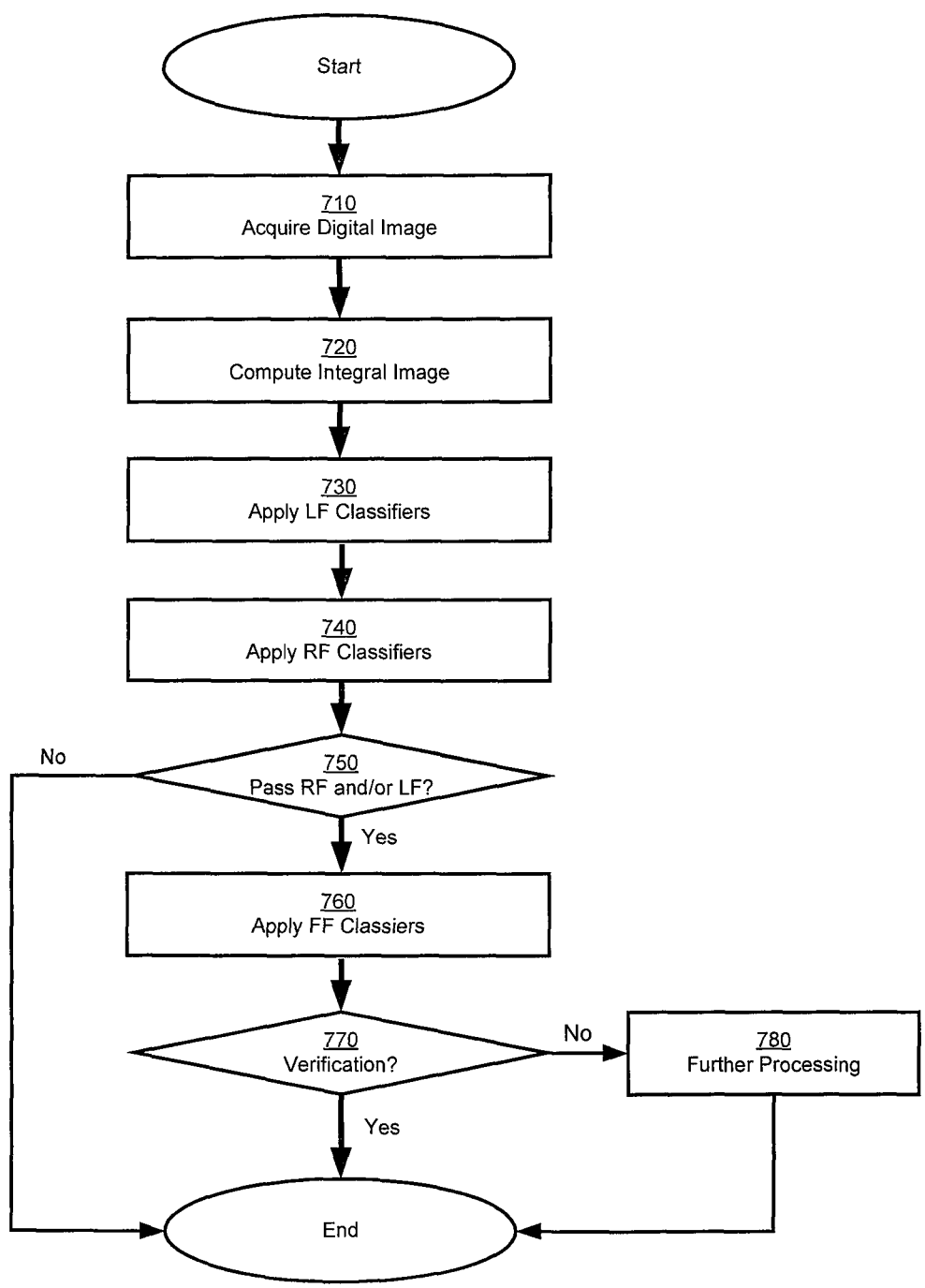
FIG. 7 shows a flow diagram of a method utilizing techniques of the present invention.

FIG. 7 is a flow diagram of a method embodying techniques of the present invention. The method includes acquiring a digital image (block 710) and computing an integral image based on the acquired digital image (block 720). Acquisition of the digital image and computation of the integral image can, for example, be performed by the digital image acquisition system as described in FIG. 1 or by a separate computing device such as a personal computer.

A chain of one or more left-face classifiers can be applied to a window of the integral image to determine if the window contains a left face (block 730). Techniques of an embodiment of the present invention can include dividing the digital image into a plurality of different size windows and applying the one or more classifiers to all windows such that the entire image is analyzed to determine the presence of a left face in any window. In alternative embodiments, face-tracking techniques, such as those described in relation to the system of FIG. 1, can determine a subset of windows to apply the chain of classifiers such that the chain is only applied to windows that likely contain a face, thus improving the speed at which the method can be applied to an acquired digital image.

The method further comprises applying a chain of one or more right-face classifiers to the integral image to determine if a window contains a right face (block 740). The right-face classifiers can be mirrors of the left-face classifiers as discussed in relation to FIG. 6.

As described above in relation to FIG. 3, the left-face classifiers and right-face classifiers can be applied as chains with each subsequent classifier in the chain providing more accuracy than previously used classifiers. Additionally, the right-face and left-face classifiers can be applied to the integral images either serially or in parallel. Further, when applying the classifier chains serially, the left-face classifiers can be applied prior to applying the right-face classifiers, or vice versa.

If, after applying both the left-face classifiers and the right-face classifiers, it is determined that the window contains neither a left face nor a right face, then the method can end (block 750, "No" path). A determination that the window contains neither a right face nor a left face corresponds to the window not containing any face. If, after applying both the left-face classifiers and the right-face classifiers it is determined that the window contains a left face, a right face, or both (block 750, "Yes" path), then a chain of full-face classifiers can be applied to the window (block 760).

Applying the chain of full-face classifiers to the window can be used to verify the determinations made by applying the chains of left-face classifiers and right-face classifiers (block 770). For example, if the chain of right-face classifiers indicates that the window contains a right face, and if the chain of left-face classifiers indicates that the window contains a left face, then applying a chain of full-face classifier should indicate that the window contains a full face. If either (a) the chain of right-face classifiers indicates the window does not contain a right face or (b) the chain of left-face classifiers indicates the window does not contain a left face, then applying a chain of full-face classifiers should indicate that the window does not contain a full face.

If applying the chain of full-face classifiers confirms the determinations made in blocks 730 and 740 (block 770, "yes" path), then the method ends. If applying the chain of full-face classifiers contradicts the determinations made in blocks 730 and 740 (block 770, "No" path), then further processing can occur to resolve the contradiction (block 780). For example, additional, usually more computationally expensive, image analysis algorithms can be applied to the window to determine if the window contains a right face, left face, full face, or no face. Alternatively, probabilities or confidence levels of the right-face, left-face, and full-face chains can be compared to determine which one has the highest degree of confidence. After the further processing resolves the contradiction, the method can end.

Hardware Overview

According to one embodiment, the techniques described herein are implemented by one or more special-purpose computing devices. The special-purpose computing devices can be incorporated into the digital image acquisition device described in FIG. 1 or might be separate from the digital image acquisition described in FIG. 1.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
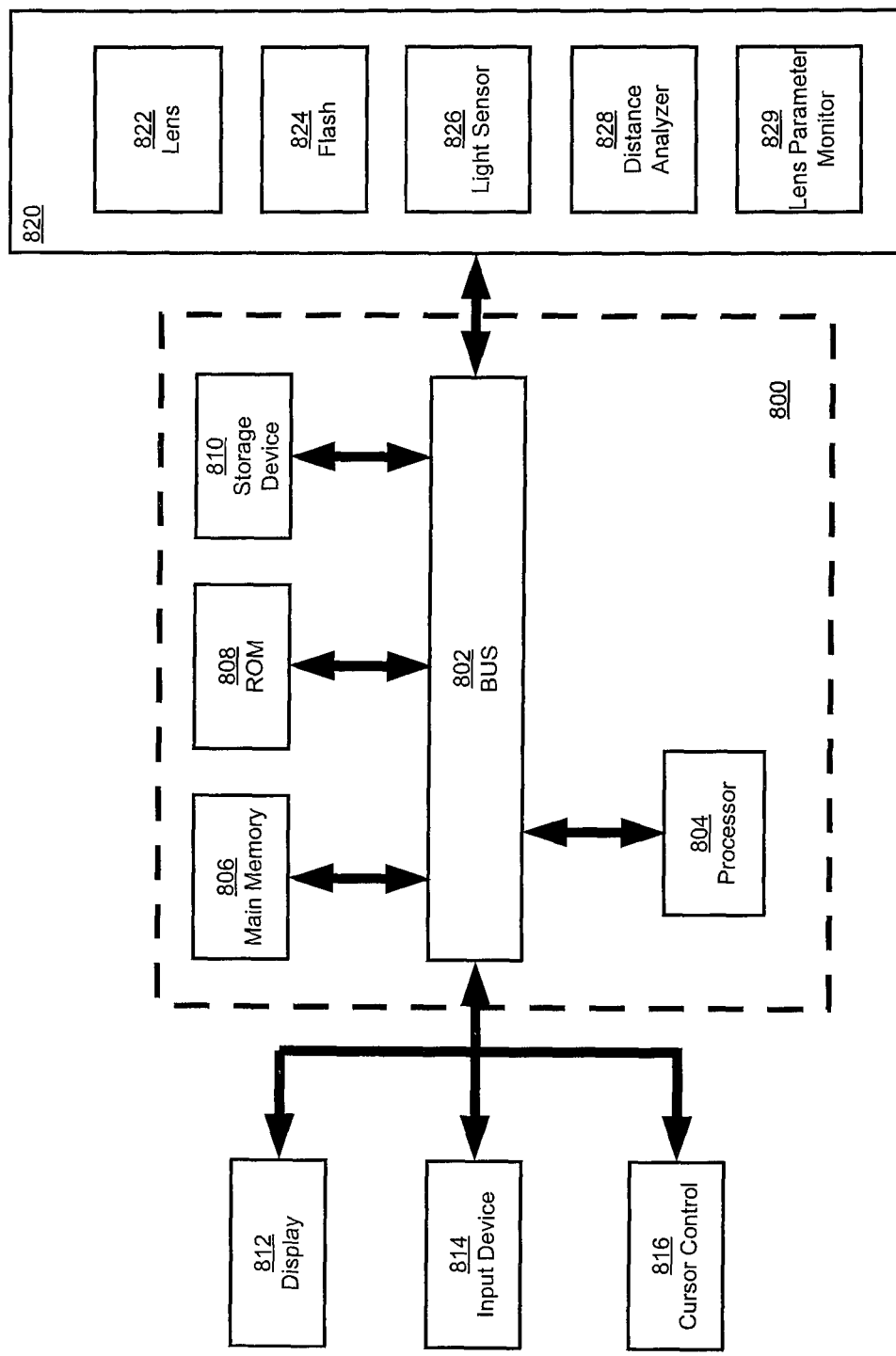
FIG. 8 shows a block diagram of a special purpose computing device for carrying out techniques of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

All references cited above herein, in addition to the background and summary of the invention sections, are hereby incorporated by reference into the detailed description of the embodiments as disclosing alternative embodiments and components, and details relating to certain embodiments. The following are also incorporated by reference for these purposes: U.S. patent application Ser. Nos. 12/479,593; 12/362,399; 12/116,140; 12/354,707; 12/042,104; 11/761,647; 11/554,539; 11/464,083; 11/027,001; 10/842,244; 11/024,046; 11/233,513; 11/460,218; 11/573,713; 11/319,766; 11/464,083; 11/744,020; 11/767,412; 10/763,801; 11/573,713; 12/042,104; 11/859,164; 12/026,484; 11/861,854; and 11/460,218; and U.S. published patent applications nos. 2008/0013798; 2008/0031498; 2006/0285754; 2006/0140455; 2006/0120599; 2006/0039690; 2008/0285754; 2007/0189748; 2007/0269108; 2008/0175481; and 2005/0068452; and U.S. Pat. Nos. 7,551,755; 7,551,754; 7,471,846; 7,469,055; 7,474,341; 7,466,866; 7,515,740; 7,315,631; 7,403,643; 7,460,694; and 7,460,695.

What is claimed is:

1. A method comprising steps of:
   determining a left-face probability based at least in part on an application of one or more left-face classifiers to an image;
   determining a right-face probability based at least in part on an application of one or more right-face classifiers to the image;
   selecting a particular characterization of the image, from a plurality of supported characterizations of the image, based at least in part on both the left-face probability and the right-face probability, wherein the plurality of supported characterizations include at least:
   (a) the image contains a left face without a visible right face, and
   (b) the image contains a right face without a visible left face; and
   wherein the steps are performed by an automated device.

2. The method of claim 1, further comprising:
   determining that a result of an application of the left-face classifiers and the right-face classifiers to the image contradicts a result of an application of a full-face classifier to the image; and
   in response to determining that the result of the application of the left-face classifiers and the right-face classifiers to the image contradicts the result of the application of the full-face classifier to the image, performing additional analysis relative to the image to determine whether the image contains a left face only, a right face only, a full face, or no face.

3. The method of claim 1, further comprising:
   calculating at least one of the right-face classifiers based on at least one of the left-face classifiers.

4. The method of claim 1, further comprising:
   identifying, within the image, a region that contains at least a specified proportion of skin-toned pixels;
   wherein the application of the one or more left-face classifiers to the image consists of an application of the one or more left-face classifiers only to said region; and
   wherein the application of the one or more right-face classifiers to the image consists of an application of the one or more right-face classifiers only to said region.

5. The method of claim 4, wherein said image is a first image, and further comprising:
   after identifying, within the first image, the region that contains the at least a specified proportion of skin-toned pixels, adjusting parameters of a face-detection algorithm based on luminance characteristics of pixels within the region and applying said face-detection algorithm to a second image that differs from said first image.

6. The method of claim 1, further comprising:
   incrementally adjusting a camera's exposure over time until application of the left-face classifiers and right-face classifiers results in a detection of at least a portion of a face within the image.

7. The method of claim 1, wherein determining the left-face probability based at least in part on the application of the one or more left-face classifiers to an image comprises:
   applying, to the image, a first left-face classifier that is designed to detect a presence of a first feature in the image; and
   only if the first left-face classifier returns a result that indicates that the first left-face classifier detected the presence of the first feature in the image, applying, to the image, a second left-face classifier that is designed to detect a presence, in the image, of a second feature that differs from the first feature;
   wherein the application of the first left-face classifier is less computationally expensive than the application of the second left-face classifier.

8. The method of claim 1 wherein the plurality of supported characterizations further include at least:
   (c) the image contains a full face, and
   (d) the image does not contain a face.

9. The method of claim 8, further comprising determining that the image contains a full face by:
   determining that the image prospectively contains a full face due to the left-face probability exceeding a first specified threshold and the right-face probability exceeding a second specified threshold; and
   verifying that the image contains a full face by receiving a positive result from an application of a full-face classifier to the image.

10. The method of claim 8, further comprising determining that the image contains a left face without a right face by:
   determining that the image prospectively contains a left face without a right face due to the left-face probability exceeding a first specified threshold and the right-face probability failing to exceed a second specified threshold; and
   verifying that the image does not contain a full face by receiving a negative result from an application of a full-face classifier to the image.

11. The method of claim 8, further comprising determining that the image contains no face by:
- determining that the image prospectively contains no face due to the left-face probability failing to exceed a first specified threshold and the right-face probability failing to exceed a second specified threshold; and
- verifying that the image does not contain a full face by receiving a negative result from an application of a full-face classifier to the image.

12. A volatile or non-volatile computer-readable storage medium storing instructions which, when executed by one or more processors, cause the processors to perform steps comprising:
- determining a left-face probability based at least in part on an application of one or more left-face classifiers to an image;
- determining a right-face probability based at least in part on an application of one or more right-face classifiers to the image;
- selecting a particular characterization of the image, from a plurality of supported characterizations of the image, based at least in part on both the left-face probability and the right-face probability, wherein the plurality of supported characterizations include at least:
  - (a) the image contains a left face without a visible right face, and
  - (b) the image contains a right face without a visible left face.

13. The computer-readable storage medium of claim 12, wherein the steps further comprise:
- determining that a result of an application of the left-face classifiers and the right-face classifiers to the image contradicts a result of an application of a full-face classifier to the image; and
- in response to determining that the result of the application of the left-face classifiers and the right-face classifiers to the image contradicts the result of the application of the full-face classifier to the image, performing additional analysis relative to the image to determine whether the image contains a left face only, a right face only, a full face, or no face.

14. The computer-readable storage medium of claim 12, wherein the steps further comprise:
- calculating at least one of the right-face classifiers based on at least one of the left-face classifiers.

15. The computer-readable storage medium of claim 12, wherein the steps further comprise:
- identifying, within the image, a region that contains at least a specified proportion of skin-toned pixels;
- wherein the application of the one or more left-face classifiers to the image consists of an application of the one or more left-face classifiers only to said region; and
- wherein the application of the one or more right-face classifiers to the image consists of an application of the one or more right-face classifiers only to said region.

16. The computer-readable storage medium of claim 15, wherein said image is a first image, and wherein the steps further comprise:
- after identifying, within the first image, the region that contains the at least a specified proportion of skin-toned pixels, adjusting parameters of a face-detection algorithm based on luminance characteristics of pixels within the region and applying said face-detection algorithm to a second image that differs from said first image.

17. The computer-readable storage medium of claim 12, wherein the steps further comprise:
- incrementally adjusting a camera's exposure over time until application of the left-face classifiers and right-face classifiers results in a detection of at least a portion of a face within the image.

18. The computer-readable storage medium of claim 12, wherein determining the left-face probability based at least in part on the application of the one or more left-face classifiers to an image comprises:
- applying, to the image, a first left-face classifier that is designed to detect a presence of a first feature in the image; and
- only if the first left-face classifier returns a result that indicates that the first left-face classifier detected the presence of the first feature in the image, applying, to the image, a second left-face classifier that is designed to detect a presence, in the image, of a second feature that differs from the first feature;
- wherein the application of the first left-face classifier is less computationally expensive than the application of the second left-face classifier.

19. The computer-readable storage medium of claim 12, wherein the plurality of supported characterizations further include at least:
- (c) the image contains a full face, and
- (d) the image does not contain a face.

20. The computer-readable storage medium of claim 19, further comprising determining that the image contains a full face by:
- determining that the image prospectively contains a full face due to the left-face probability exceeding a first specified threshold and the right-face probability exceeding a second specified threshold; and
- verifying that the image contains a full face by receiving a positive result from an application of a full-face classifier to the image.

21. The computer-readable storage medium of claim 19, further comprising determining that the image contains a left face without a right face by:
- determining that the image prospectively contains a left face without a right face due to the left-face probability exceeding a first specified threshold and the right-face probability failing to exceed a second specified threshold; and
- verifying that the image does not contain a full face by receiving a negative result from an application of a full-face classifier to the image.

22. The computer-readable storage medium of claim 19, further comprising determining that the image contains no face by:
- determining that the image prospectively contains no face due to the left-face probability failing to exceed a first specified threshold and the right-face probability failing to exceed a second specified threshold; and
- verifying that the image does not contain a full face by receiving a negative result from an application of a full-face classifier to the image.

23. A digital camera comprising:
- an image capturing and storing module;
- a left-face classifier module that determines a left-face probability based at least in part on an application of one or more left-face classifiers to an image;
- a right-face classifier module that determines a right-face probability based at least in part on an application of one or more right-face classifiers to the image; and an image labeling module that selects a particular characterization of the image, from a plurality of supported characterizations of the image, based at least in part on both the left-face probability and the right-face probability, wherein the plurality of supported characterizations include at least:
(a) the image contains a left face without a visible right face, and
(b) the image contains a right face without a visible left face.

24. The digital camera of claim 23, further comprising:
an analytical modules that (a) determines that a result of an application of the left-face classifiers and the right-face classifiers to the image contradicts a result of an application of a full-face classifier to the image and (b) in response to determining that the result of the application of the left-face classifiers and the right-face classifiers to the image contradicts the result of the application of the full-face classifier to the image, performs additional analysis relative to the image to determine whether the image contains a left face only, a right face only, a full face, or no face.

25. The digital camera of claim 23, further comprising:
a classifier-generating module that calculates at least one of the right-face classifiers based on at least one of the left-face classifiers.

26. The digital camera of claim 23, further comprising:
a tone-identifying module that identifies, within the image, a region that contains at least a specified proportion of skin-toned pixels;
wherein the application of the one or more left-face classifiers to the image consists of an application of the one or more left-face classifiers only to said region; and
wherein the application of the one or more right-face classifiers to the image consists of an application of the one or more right-face classifiers only to said region.

27. The digital camera of claim 26, wherein said image is a first image, and further comprising:
an algorithm-adjustment module which, after identifying, within the first image, the region that contains the at least a specified proportion of skin-toned pixels, adjusts parameters of a face-detection algorithm based on luminance characteristics of pixels within the region and an application of said face-detection algorithm to a second image that differs from said first image.

28. The digital camera of claim 23, further comprising:
an exposure-adjustment module that incrementally adjusts a camera's exposure over time until application of the left-face classifiers and right-face classifiers results in a detection of at least a portion of a face within the image.

29. The digital camera of claim 23, wherein determining the left-face probability based at least in part on the application of the one or more left-face classifiers to an image comprises:
applying, to the image, a first left-face classifier that is designed to detect a presence of a first feature in the image; and
only if the first left-face classifier returns a result that indicates that the first left-face classifier detected the presence of the first feature in the image, applying, to the image, a second left-face classifier that is designed to detect a presence, in the image, of a second feature that differs from the first feature;
wherein the application of the first left-face classifier is less computationally expensive than the application of the second left-face classifier.

30. The digital camera of claim 23, wherein the plurality of supported characterizations further include at least:
(c) the image contains a full face, and
(d) the image does not contain a face.

31. The digital camera of claim 30, further comprising determining that the image contains a full face by:
determining that the image prospectively contains a full face due to the left-face probability exceeding a first specified threshold and the right-face probability exceeding a second specified threshold; and
verifying that the image contains a full face by receiving a positive result from an application of a full-face classifier to the image.

32. The digital camera of claim 30, further comprising determining that the image contains a left face by:
determining that the image prospectively contains a left face without a right face due to the left-face probability exceeding a first specified threshold and the right-face probability failing to exceed a second specified threshold; and
verifying that the image does not contain a full face by receiving a negative result from an application of a full-face classifier to the image.

33. The digital camera of claim 30, further comprising determining that the image contains a no face by:
determining that the image prospectively contains no face due to the left-face probability failing to exceed a first specified threshold and the right-face probability failing to exceed a second specified threshold; and
verifying that the image does not contain a full face by receiving a negative result from an application of a full-face classifier to the image.

34. A method comprising steps of:
determining a left-face probability based at least in part on an application of a particular left-face classifier of a plurality of left-face classifiers to an image,
wherein each left-face classifier of the plurality of left-face classifiers includes a left-face classifier threshold,
wherein the particular left-face classifier includes a first left-face classifier threshold that is different than a second left-face classifier threshold;
determining whether the left-face probability is equal to or greater than the first left-face classifier threshold;
determining a right-face probability based at least in part on an application of a particular right-face classifier of a plurality of right-face classifiers to the image,
wherein each right-face classifier of the plurality of right-face classifiers includes a right-face classifier threshold,
wherein the particular right-face classifier includes a first right-face classifier threshold that is different than a second right-face classifier threshold;
determining whether the right-face probability is equal to or greater than the first right-face classifier threshold;
based at least in part whether the left-face probability is equal to or greater than the first left-face classifier threshold and whether the right-face probability is equal to or greater than the first right-face classifier threshold, determining which one of the following is true relative to the image:
(a) the image contains a full face,
(b) the image contains a left face without a right face,
(c) the image contains a right face without a left face, or
(d) the image does not contain a face;
wherein the steps are performed by an automated device.

* * * * *